(12) United States Patent
Eluru et al.

(10) Patent No.: US 11,466,194 B2
(45) Date of Patent: Oct. 11, 2022

(54) FOAMED GEL TREATMENT FLUIDS AND METHODS OF USE

(71) Applicant: Halliburton Energy Services, Inc., Houston, TX (US)

(72) Inventors: Sairam Eluru, Pune (IN); Rajender Salla, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/170,156

(22) Filed: Feb. 8, 2021

(65) Prior Publication Data

US 2021/0163811 A1    Jun. 3, 2021

Related U.S. Application Data

(62) Division of application No. 16/337,538, filed as application No. PCT/US2016/059414 on Oct. 28, 2016, now Pat. No. 10,961,429.

(51) Int. Cl.
*C09K 8/508* (2006.01)
*C09K 8/518* (2006.01)
(Continued)

(52) U.S. Cl.
CPC .......... *C09K 8/5083* (2013.01); *C08F 120/18* (2013.01); *C08F 120/28* (2013.01);
(Continued)

(58) Field of Classification Search
CPC ............ C09K 2208/24; C09K 2208/26; C09K 8/506; C09K 8/5083; C09K 8/518;
(Continued)

(56) References Cited

U.S. PATENT DOCUMENTS 5,840,789 A    11/1998  Verstrat et al.
6,562,764 B1    5/2003  Donaldson et al.
(Continued)

FOREIGN PATENT DOCUMENTS

WO    2015/126402 A1    8/2015

OTHER PUBLICATIONS

Lv, Qichao, et al. "Study of nanoparticle-surfactant-stabilized foam as a fracturing fluid." Industrial & Engineering Chemistry Research 54.38 (2015): 9468-9477.

(Continued)

*Primary Examiner* — Zakiya W Bates
(74) *Attorney, Agent, or Firm* — Kilpatrick Townsend & Stockton LLP

(57) ABSTRACT

Certain foamed gel treatment fluids and methods of using the treatment fluids in wellbores penetrating subterranean formations are provided. In one embodiment, the treatment fluids comprise: an aqueous base fluid, a gas, a plurality of particulates, and a plurality of swellable particles each comprising a material having a first monomer, a second monomer, and a third monomer comprising a foamable surfactant. In one embodiment, the methods comprise: preparing a treatment fluid comprising an aqueous base fluid and a swellable particle that comprises a material having a first monomer, a second monomer, and a third monomer comprising a foamable surfactant; introducing the treatment fluid into a wellbore penetrating at least a portion of a subterranean formation; and blending the treatment fluid while in the wellbore to form a foamed gel.

16 Claims, 3 Drawing Sheets

(51) Int. Cl.
*C08F 120/18* (2006.01)
*C08F 120/28* (2006.01)
*E21B 43/26* (2006.01)

(52) U.S. Cl.
CPC .............. *C09K 8/518* (2013.01); *E21B 43/26* (2013.01); *C09K 2208/24* (2013.01); *C09K 2208/26* (2013.01)

(58) Field of Classification Search
CPC . C09K 8/68; C09K 8/703; C09K 8/76; C09K 8/86; C09K 8/94
See application file for complete search history.

(56) References Cited

U.S. PATENT DOCUMENTS

| | | |
|---|---|---|
| 8,985,212 B1 | 3/2015 | Crespo et al. |
| 2002/0009420 A1 | 1/2002 | McLaughlin |
| 2008/0234147 A1 | 9/2008 | Li et al. |
| 2009/0176667 A1 | 7/2009 | Nguyen |
| 2009/0312445 A1 | 12/2009 | Roddy et al. |
| 2014/0251625 A1 | 9/2014 | Nelson et al. |
| 2016/0060418 A1* | 3/2016 | Tian ........................ B01J 20/265 521/114 |

OTHER PUBLICATIONS

Lam, Stephanie, Krassimir P. Velikov, and Odin D. Velev. "Pickering stabilization of foams and emulsions with particles of biological origin." Current Opinion in Colloid & Interface Science 19.5 (2014): 490-500.

International Search Report and Written Opinion issued in related PCT Application No. PCT/US2016/059414 dated Jul. 24, 2017, 17 pages.

Structure Plus Product Information located at https://surfacechemistry.nouryon.com/webchannel/surface-chemistry/structure-plus/, 2 pages.

* cited by examiner

FOAMED GEL TREATMENT FLUIDS AND METHODS OF USE

CROSS-REFERENCE TO RELATED APPLICATIONS

This application claims priority to and is a divisional application of U.S. application Ser. No. 16/337,538 filed on Mar. 28, 2019 entitled "Foamed Gel Treatment Fluids And Methods Of Use," which is a National Stage application of International Application No. PCT/US2016/059414 filed Oct. 28, 2016, both of which are incorporated herein by reference in their entirety for all purposes.

BACKGROUND

The present disclosure relates generally to methods and compositions for treating subterranean formations. More particularly, the present disclosure relates to certain foamed gel treatment fluids and methods of using the treatment fluids in wellbores penetrating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

One common subterranean operation that employs a treatment fluid is hydraulic fracturing. Hydraulic fracturing operations generally involve pumping a treatment fluid (e.g., a fracturing fluid) into a wellbore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the wellbore.

Another common subterranean operation that employs a treatment fluid is gravel packing. Gravel packing is one of many methods of completing a wellbore along with cementing and perforating a wellbore. Treatment fluids are used to carry the gravel into the wellbore and place it at the gravel packing site. As used herein, the term "gravel," shall be understood to include not only natural gravel but other proppant type materials, natural and man-made or synthetic, such as, for example, sand, pebbles, and synthetic beads.

Treatment fluids are often gelled or foamed to suspend the particulates (e.g., proppant or gravel) in the treatment fluid in order to place the particulates in a desired location within in the wellbore. Once the particulates are substantially in place within the wellbore, the viscosity of the treatment fluid usually is reduced, and the treatment fluid may be recovered from the formation.

BRIEF DESCRIPTION OF THE DRAWINGS

These drawings illustrate certain aspects of some of the embodiments of the present disclosure and should not be used to limit or define the claims.

Figure 1:
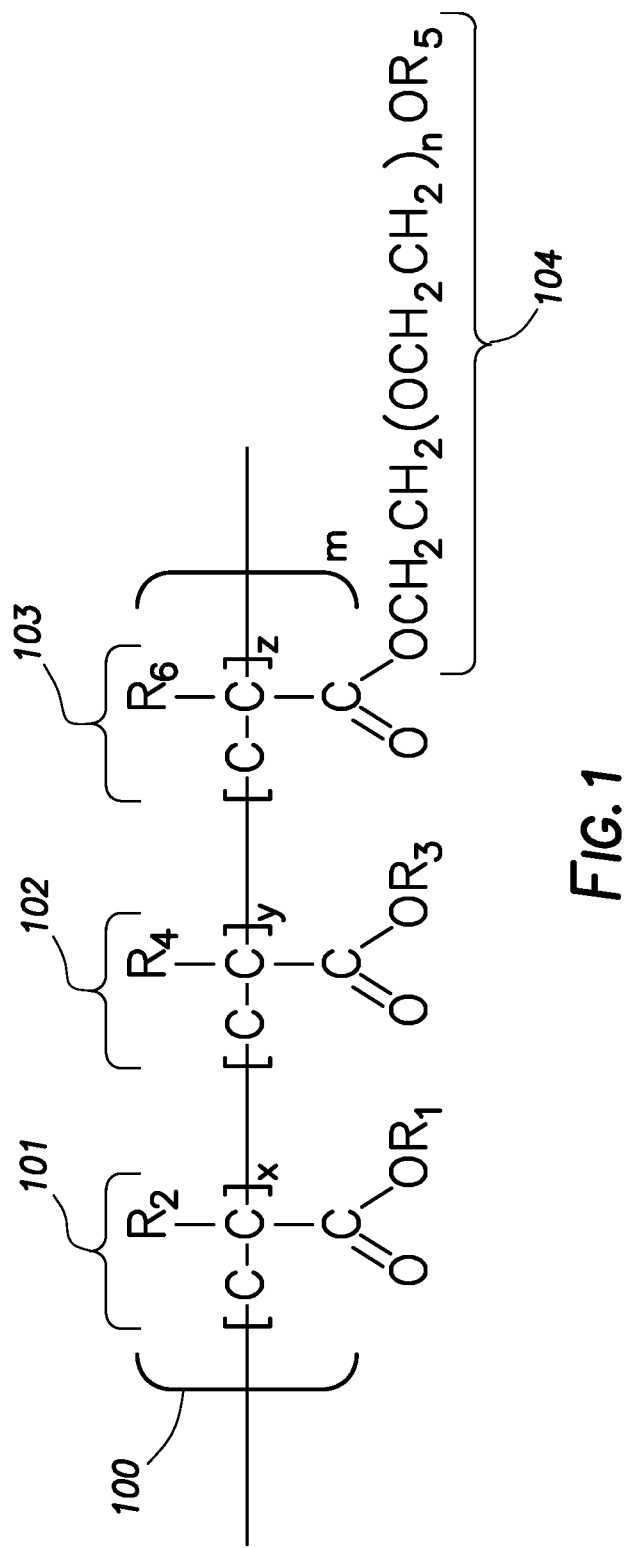
FIG. 1 is a diagram illustrating the structural formula of a material for a swellable particle in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The treatment fluids of the present disclosure generally comprise an aqueous base fluid and a swellable particle. The swellable particles of the present disclosure generally comprise a material having a first monomer, a second monomer, and a third monomer. In certain embodiments, the third monomer may comprise a foamable surfactant. In some embodiments, the second monomer may comprise a pH-responsive moiety. In such embodiments, the treatment fluids of the present disclosure may further comprise an acid. Additionally, other additives suitable for use in a particular subterranean operation may be included in the treatment fluids of the present disclosure as recognized by those of ordinary skill in the art having the benefit of this disclosure.

In certain embodiments, the treatment fluids of the present disclosure may be blended with a gas to form a stable foamed gel. In such embodiments, the swellable particles may absorb at least a portion of the aqueous base fluid and swell to form a gel thereby increasing the viscosity of the treatment fluid. In the embodiments in which the second monomer comprises a pH-responsive moiety, the pH-responsive moiety may aid in the swelling of the swellable particles to form the gel. The foamable surfactant may cause the gel to foam when blended with the gas.

Among the many advantages to the compositions and methods of the present disclosure, only some of which are alluded to herein, the treatment fluid and methods of the present disclosure may, among other benefits, provide for enhanced suspension of particulates in a treatment fluid. The ability of the treatment fluids of the present disclosure to form a foamed gel may result in several improvements as compared to treatment fluids that comprise only natural or synthetic polymer gelling agents. For example, the foamed gel treatment fluids of the present disclosure may more effectively carry particulates and also may require a smaller amount of gelling agent as compared to certain treatment fluids known in the art, reducing the amount of residue left in the subterranean formation by natural or synthetic gelling agents. The foamed gel treatment fluids of the present disclosure also may be able to support particulates using a lower volume of liquid in the treatment fluid as compared to treatment fluids that comprises only natural or synthetic polymer gelling agents. Furthermore, the foamed gel treatment fluids of the present disclosure may have low fluid loss properties, potentially reducing or removing the need for a fluid loss control additive.

Additionally, in certain embodiments, the swellable particles of the present disclosure may comprise material having a pH-responsive moiety. In such embodiments, the swellable particle will only substantially swell upon the reduction of the pH of the treatment fluid in which the swellable particle is located. Thus, there may be little to no premature swelling of the swellable particles. Accordingly, the inclusion of the pH-responsive moiety may allow for pre-mixing of the treatment fluid prior to transportation and activation of swelling of the swellable particles on site.

The swellable particles that may be useful in accordance with the present disclosure may comprise any suitable material that absorbs an aqueous solution and swells (e.g., expands) as it absorbs the aqueous solution. In certain embodiments, the swellable particles may comprise a material having a first monomer, a second monomer, and a third monomer that comprises a foamable surfactant. In some embodiments, the second monomer may comprise a pH-responsive moiety. In certain embodiments, the material for the swellable particles may comprise a first monomer and a second monomer each selected from the group consisting of: a $C_1$ to $C_6$ alkyl ester of acrylic acid and a $C_1$ to $C_6$ alkyl ester of methacrylic acid. As used herein, the nomenclature "$C_x$ to $C_y$," refers to the number of carbon atoms in a hydrocarbon chain (here, ranging from x to y carbon atoms).

In certain embodiments, the material for the swellable particles may comprise a third monomer that comprises a foamable surfactant. In certain embodiments, the third monomer may be acrylic acid or methacrylic acid esterified with a foamable surfactant. The foamable surfactants that may be useful in accordance with the present disclosure included, but not limited to, polyoxyethylene alcohols such as poly(oxyethylene) (20) stearyl ether, poly(oxyethylene) (20) cetyl ether and poly(oxyethylene) lauryl ether; ethoxylated alkyl phenols such as poly(oxyethylene) (3) nonylphenol and poly(oxyethylene) (8) dinonyl phenol; polyoxyethylene fatty acid esters such as poly(oxyethylene) (8) stearate and poly(oxyethylene) (40) stearate; and polyoxyethylene sorbitan fatty acid esters, such as polyoxyethylene) (20) sorbitan monolaurate and polyoxyethylene) (40) sorbitan monostearate. Those of ordinary skill in the art with the benefit of this disclosure will recognize other foamable surfactants suitable for use in accordance with the present disclosure.

As illustrated in FIG. 1, the swellable particles of the present disclosure, in certain embodiments, may comprise materials having the following structural formula:

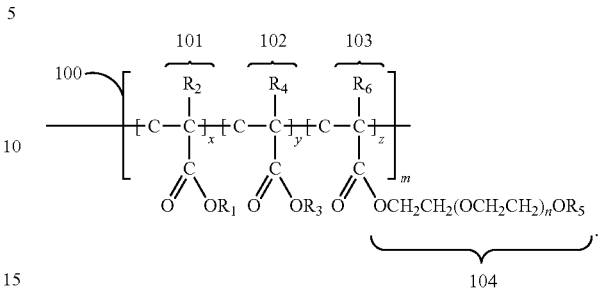

FIG. 1 illustrates the structural formula for a material 100 for a swellable particle in accordance with certain embodiments of the present disclosure. The material 100 comprises a first monomer 101, a second monomer 102, and a third monomer 103 comprising a foamable surfactant 104. First monomer 101, second monomer 102, and third monomer 103 may be selected in accordance with the above disclosure. Accordingly, $R_1$ and $R_3$ of first monomer 101 and second monomer 102, respectively, each may independently comprise a $C_1$ to $C_6$ alkyl chain. In certain embodiments, $R_2$ and $R_4$ of first monomer 101 and second monomer 102, respectively, each may be independently selected from the group consisting of: a hydrogen atom or a methyl group. As used herein, "independently" refers to the notion that the preceding items may be the same or different. Thus, first monomer 101 may be the same as or different than second monomer 102.

In accordance with the above disclosure with respect to the third monomer comprising the foamable surfactant, $R_6$ of third monomer 103 may be selected from the group consisting of: a hydrogen atom or a methyl group; $R_5$ of foamable surfactant 104 may be selected from the group consisting of: an alkyl chain, an alkyl phenol, a dialkyl phenol, a fatty acid ester, a sorbitan fatty acid ester, and any combination thereof: and n of foamable surfactant 104 may be an integer from about 2 to about 39. As will be appreciated by those of ordinary skill in the art with the benefit of this disclosure, the number of each monomer and the number of repeating units may vary. Accordingly, m, x, y, and z each may be independently an integer from 1 to about 100,000.

As mentioned above, the second monomer may further comprise a pH-responsive moiety in certain embodiments. Thus, in such embodiments, the swellable particles may comprise a material having a first monomer, a second monomer comprising the pH-responsive moiety, and a third monomer comprising the foamable surfactant. In such embodiments, the first monomer and the third monomer may be selected in accordance with the above disclosure. However, in such embodiments, the second monomer may be selected from the group consisting of: a vinyl-substituted heterocyclic compound containing at least one of a nitrogen atom, a mono- or di-($C_1$ to $C_4$)alkylamino ($C_1$ to $C_4$)alkyl acrylate, a mono- or di-($C_1$ to $C_4$)alkylamino ($C_1$ to $C_4$)alkyl methacrylate. Examples of such monomers include, but are poly(2-diethylaminoethyl methacrylate) ("PDEAEMA"), poly(N,N-dimethylaminoethyl methacrylate) ("PDMAEMA"), and N, N-dimethylaminoethyl methacrylate ("DMAEMA"). In some embodiments, the second monomers may also be a mono or di-($C_1$ to $C_4$)alkylamino ($C_1$ to $C_4$)alkyl acrylamide or a mono or di-($C_1$ to $C_4$)alkylamino ($C_1$ to $C_4$)alkyl methacrylamide.

However, without limiting the present disclosure to a particular theory, it is believed that a monomer with an acrylate at one end and a tertiary amine which is not directly connected to the carbonyl group at the other end, such as Structure (A) below, may more actively participate in cross-linking during polymerization than monomers that have an amine group directly connected to the carbonyl group, such as Structures (B) and (C) below, which may lead to swellable particles that are more pH-responsive. Thus, in some embodiments, monomers with structures similar to Structure (A) may be more preferred second monomers than monomers with structures similar to Structures (B) and (C).

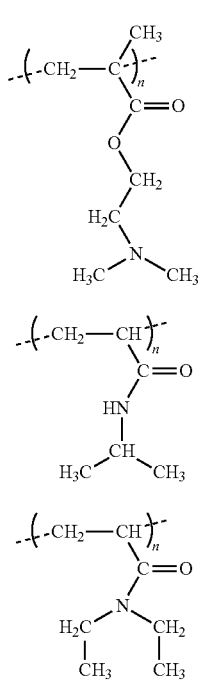

Figure 2:
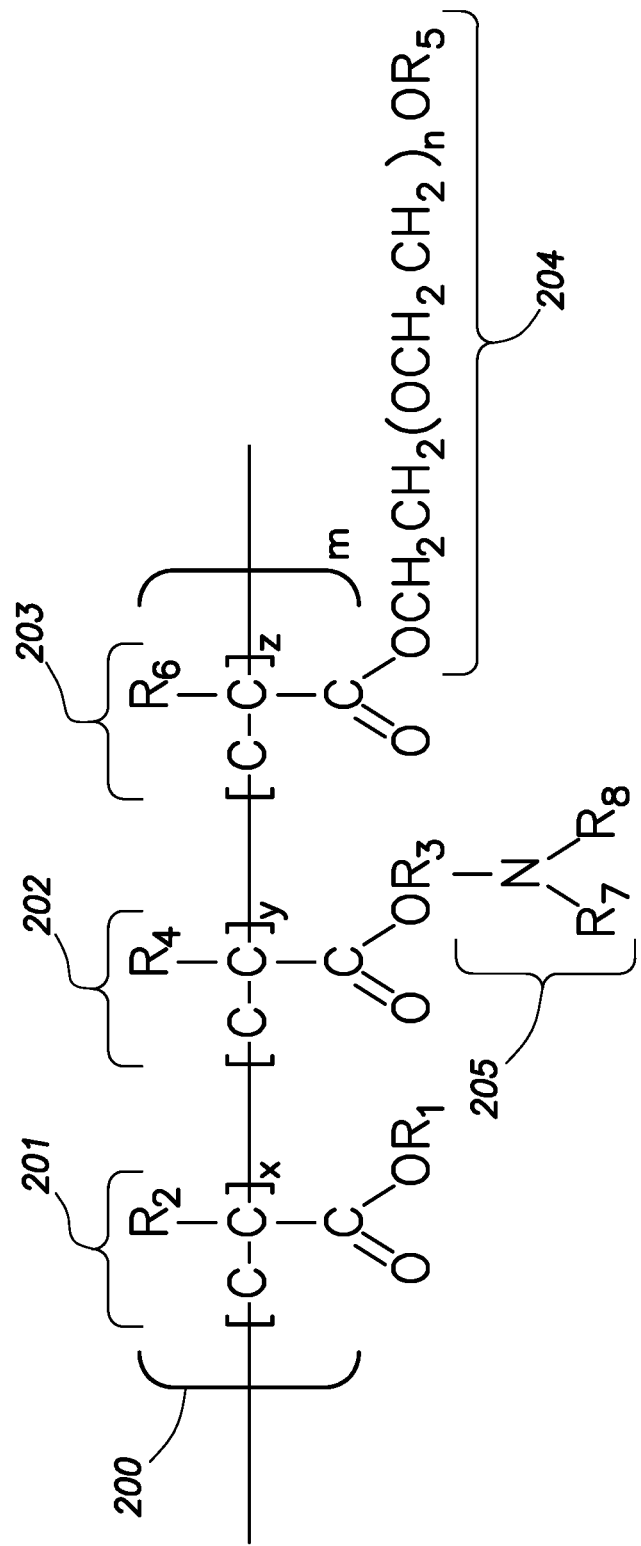
FIG. 2 is a diagram illustrating the structural formula of a material for a swellable particle in accordance with certain embodiments of the present disclosure.

As illustrated in FIG. 2, in certain embodiments, the swellable particles of the present disclosure may comprise materials having the following structural formula:

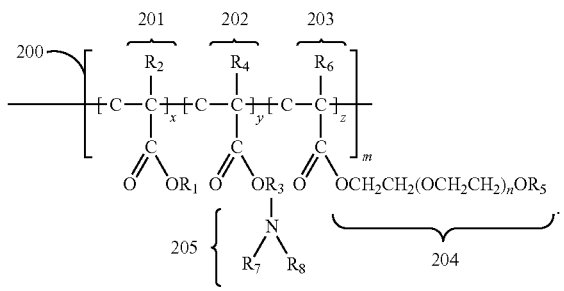

FIG. 2 illustrates the structural formula for a material 200 for a swellable particle in accordance with certain embodiments of the present disclosure. The material 200 comprises a first monomer 201, a second monomer 202 comprising a pH-responsive moiety 205, and a third monomer 203 comprising a foamable surfactant 204 selected in accordance with the above disclosure. In accordance with the above disclosure, $R_1$ and $R_3$ of first monomer 201 and second monomer 202, respectively, each may independently comprise a $C_1$ to $C_6$ alkyl chain. In certain embodiments, $R_2$ and $R_4$ of first monomer 101 and second monomer 102, respectively, each may be independently selected from the group consisting of: a hydrogen atom or a methyl group. In certain embodiments, $R_7$ and $R_8$ of pH responsive-moiety 205 each may independently comprise a hydrogen atom or a $C_1$ to $C_4$ alkyl chain.

In accordance with the above disclosure with respect to the third monomer comprising the and foamable surfactant, $R_6$ of third monomer 203 may be selected from the group consisting of: a hydrogen atom or a methyl group; $R_5$ of foamable surfactant 204 may be selected from the group consisting of: an alkyl chain, an alkyl phenol, a dialkyl phenol, a fatty acid ester, a sorbitan fatty acid ester, and any combination thereof: and n of foamable surfactant 204 may be an integer from about 2 to about 39. As will be appreciated by those of ordinary skill in the art with the benefit of this disclosure, the number of each monomer and the number of repeating units may vary. Accordingly, m, x, y, and z each may be independently an integer from 1 to about 100,000. One example of a material for the swellable particles of the present disclosure is acrylates/amino acrylates/$C_{10}$-30 alkyl PEG-20 itaconate copolymer in which first monomer 201 comprises a $C_1$ to $C_6$ alkyl ester of acrylic acid or a $C_1$ to $C_6$ alkyl ester of methacrylic acid, second monomer 202 comprises a $C_1$ to $C_4$ alkyl aminoacrylate, and third monomer 203 comprises $C_{10}$ to $C_{30}$ alkyl PEG-20 itaconate.

In certain embodiments, the swellable particles of the present disclosure may be combined with an aqueous base fluid to form a treatment fluid. Depending on the type of treatment to be performed, the treatment fluid may comprise any treatment fluid known in the art. Treatment fluids that may be useful in accordance with the present disclosure include, but are not limited to, fracturing fluids, gravel packing fluids, pre-pad fluids, pad fluids, pre-flush fluids, after-flush fluids, acidic fluids, consolidation fluids, cementing fluids, wellbore clean-out fluids, conformance fluids, aqueous base fluids (e.g., fresh water, salt water, brines, etc.), foamed fluids (e.g., a liquid that comprises a gas), gels, emulsions, gases, and the like.

The treatment fluids that may be useful in accordance with the present disclosure may comprise any aqueous base fluid known in the art. The term "base fluid" refers to the major component of the fluid (as opposed to components dissolved and/or suspended therein) and does not indicate any particular condition or property of that fluids such as its mass, amount, pH, etc. Aqueous base fluids that may be suitable for use in the methods of the present disclosure may comprise water from any source. Such aqueous base fluids may comprise fresh water, salt water (e.g., water containing one or more salts dissolved therein), brine (e.g., saturated salt water), seawater, or any combination thereof. In most embodiments of the present disclosure, the aqueous base fluids comprise one or more ionic species, such as those formed by salts dissolved in water. For example, seawater and/or produced water may comprise a variety of divalent cationic species dissolved therein. In certain embodiments, the density of the aqueous base fluid can be adjusted, among other purposes, to provide additional particulate transport and suspension in the compositions of the present disclosure. In certain embodiments, the pH of the aqueous base fluid may be adjusted (e.g., by a buffer or other pH adjusting agent) to a specific level, which may depend on, among other factors, the types of viscosifying agents, acids, and other additives included in the fluid. Those of ordinary skill in the art with the benefit of this disclosure will recognize when such density and/or pH adjustments are appropriate.

As will be appreciated by those of ordinary skill in the art with the benefit of this disclosure, the effective amount of swellable particles in a treatment fluid may vary depending on factors such as the type of base fluid, the size of particulates to be suspended in the treatment fluid, the desired viscosity of the treatment fluid, the required fluid loss, and/or the like. In certain embodiments, the treatment fluid may comprise the swellable particles in an amount from about 0.01 to about 3000 pounds swellable particles/1,000 gallons treatment fluid. In some embodiments, the treatment fluid may comprise the swellable particles in an amount from about 1 to about 600 pounds swellable particles/1,000 gallons treatment fluid. In other embodiments, the treatment fluid may comprise the swellable particles in an amount from about 10 to about 200 pounds swellable particles/1,000 gallons treatment fluid.

In certain embodiments, the treatment fluids of the present disclosure further may comprise one or more acids. The acids that may be useful in accordance with the present disclosure may comprise any organic acid, inorganic acid, and combinations thereof that are known in the art. Examples of acids that are commonly used in treatment fluids and that may be useful in accordance with the present disclosure include, but are not limited to, hydrofluoric acid, acetic acid, formic acid, citric acid, glycolic acid, lactic acid, phosphoric acid, sulfamic acid, and any combination thereof. As will be appreciated by those of ordinary skill in the art with the benefit of this disclosure, in certain embodiments, one or more acids may be selected for use in a treatment fluid that comprises a swellable particle comprising a pH responsive moiety. In such embodiments, the one or more acids may be selected so as to decrease the pH of the treatment fluid to an effective level to aid in the swelling of the swellable particles.

In certain embodiments, the treatment fluids of the present disclosure also may comprise one or more surfactants. In such embodiments, the treatment fluids may include any surfactant that is compatible or synergistic with the swellable particles of the present disclosure. Those of ordinary skill in the art with the benefit of this disclosure will recognize the types and amount of surfactants that may be included in the treatment fluids of the present disclosure for a particular application. Surfactants that may be suitable for use in certain embodiments of the present disclosure include, but are not limited to, laureth sulfates, lauryl sulfates, sodium cocoyl sarcosinate, decyl polyglucose, cocamidopropyl amine oxide, lauramide DEA, cocamidopropyl betaine (CAPB), sodium cocoamphoacetate (CAA), and any combination thereof.

In certain embodiments, the treatment fluids of the present disclosure also may comprise one or more particulates. In such embodiments, the treatment fluids may include any particulates (such as proppant particulates or gravel particulates) suitable for use in subterranean applications. Particulates that may be suitable for use in certain embodiments of the present disclosure may comprise any material suitable for use in subterranean operations. For example, proppant particulates may be used in conjunction with hydraulic fracturing to prevent the fractures from fully closing upon the release of hydraulic pressure, forming conductive channels through which fluids may flow to the wellbore. Those of ordinary skill in the art with the benefit of this disclosure will recognize the types, sizes, and amount of particulates that may be included in the treatment fluids of the present disclosure for a particular application.

Particulates that may be suitable in certain embodiments of the present disclosure include, but are not limited to, proppant, gravel, sand, bauxite, ceramic materials, glass materials, polymer materials, TEFLON® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

In certain embodiments, the particulates may have a size from about 0.001 mm to about 2.5 mm. In other embodiments, the particulates may have a size from about 0.001 mm to about 0.5 mm, in other embodiments, about 0.5 mm to about 1.0 mm, in other embodiments, about 1.0 mm to about 1.5 mm, in other embodiments, about 1.5 mm to about 2.0 mm, and in other embodiments, about 2.0 mm to about 2.5 mm. In certain embodiments, the particulates may have a size from about 0.001 mm to 0.005 mm. In other embodiments, the particulates may have a size from about 0.001 mm to about 0.002 mm, in other embodiments, about 0.002 mm to about 0.003 mm, in other embodiments, about 0.003 mm to about 0.004 mm, and in other embodiments, about 0.004 mm to about 0.005 mm.

In certain embodiments, the treatment fluid may comprise particulates in an amount from about 0.1 to about 10 pounds of particulates/gallon of treatment fluid (ppg). In other embodiments, the treatment fluid may comprise particulates in an amount from about 0.1 ppg to about 5.0 ppg. In other embodiments, the treatment fluid may comprise particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

The treatment fluids used in accordance with the methods of the present disclosure optionally may comprise any number of additives. Examples of such additional additives include, but are not limited to, salts, additional surfactants, additional acids, additional proppant particulates, diverting agents, fluid loss control additives, tracking chemicals, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, additional breakers, weighting agents, relative permeability modifiers, sealants, resins, wetting agents, coating enhancement agents, filter cake removal agents, antifreeze agents (e.g., ethylene glycol), and/or the like. Those of ordinary skill in the art with the benefit of this disclosure will recognize the types of additives that may be included in the treatment fluids of the present disclosure for a particular application.

In certain embodiments, the swellable particles may begin to substantially swell upon contact with the aqueous base fluid. In other embodiments in which the second monomer comprises a pH-responsive moiety, an acid may be required to cause the swellable particles to substantially swell. In such embodiments, the swellable particle may substantially swell when the pH of the treatment fluid is at or below about 5.

In certain embodiments, the treatment fluid may be blended with a gas. As used herein, the term "blend" and grammatical variations thereof includes actions such as mixing, combining, stirring, agitating, and/or the like. In such embodiments, the treatment fluid may foam when blended with the gas to form a stable foamed gel. Gases that may be suitable in certain embodiments of the present disclosure include, but are not limited to, air, carbon dioxide, nitrogen, and any combination thereof. If an acid is required to swell the swellable particles, the acid may be added to the treatment fluid prior to or during blending to reduce the pH of the treatment fluid in order to aid in the swelling of the swellable particle.

In certain embodiments, one or more particulates may be added to the treatment fluid either before or after the treatment fluid has been blended to form the stable foamed gel. In such embodiments, at least a portion of the particulates may remain suspended in the stable foamed gel. In certain embodiments, the foamed gel may remain stable for up to about 24 hours. In certain embodiments, the foamed gel may remain stable at temperatures up to about 400° F. As used herein, the term "stable" and grammatical variants thereof refer to the ability of the foamed gel to suspend particulates. Thus, in certain embodiments, particulates may remain suspended in the treatment fluid for up to about 24 hours and/or at temperatures up to about 400° F.

In certain embodiments, the treatment fluid may be introduced into a wellbore penetrating at least a portion of a subterranean formation. In such embodiments, the treatment fluid may be allowed to flow to a desired location in the wellbore. Those of ordinary skill in the art will recognize, with the benefit of the present disclosure, a desirable location for the treatment fluid within the wellbore and/or subterranean formation based on the particular subterranean operation being performed. For example, in a fracturing operation, a treatment fluid comprising proppant may be allowed to enter fractures within the subterranean formation wherein the proppant may be deposited. After the treatment fluid has performed its intended purpose, a breaker may be introduced into the wellbore and may contact at least a portion of the treatment fluid and/or foamed gel. In such embodiments, the breaker may destabilize the foamed gel and reduce the viscosity of the treatment fluid thus allowing for any particulates in the treatment fluid to be deposited within the wellbore and allowing for removal of the treatment fluid from the wellbore.

Breakers that may be suitable for use in certain embodiments include, but are not limited to, oxidizing agents, enzyme acids, catalysts of iron, copper and silver, and any combination thereof. Examples of breakers that may be suitable for use in certain embodiments of the present disclosure include, but are not limited to, sodium persulfate, ammonium persulfate, alpha and beta amylases, amyloglucosidase, aligoglucosidase, invertase, maltase, cellulase, hemicellulase, fumaric acid, nitric acid, and the like, and any combination thereof. In certain embodiments, the breaker may be in the form of a liquid, a powder, or combinations thereof. In the embodiments which the breaker is powder, the breaker may be activated by contact with hydrocarbons or water. Additionally, in embodiments in which the material for the swellable particle comprises a pH-responsive moiety, any bases known in the art may be used as a breaker. In such embodiments, the base may increase the pH of the treatment fluid thereby at least partially inhibiting the ability of the swellable particle to swell in the treatment fluid and decreasing the viscosity of the treatment fluid.

In certain embodiments, the treatment fluid may be an acidic treatment fluid. Any known acidic treatment fluid used for acidizing operations in a subterranean formation may be used. In certain embodiments, the acidic treatment fluid may comprise hydrochloric acid. In certain embodiments, the acidic treatment fluid may include one treatment fluid selected from the group consisting of: hydrofluoric acid, acetic acid, formic acid, citric acid, ethylene diamine tetra acetic acid ("EDTA"), glycolic acid, sulfamic acid, and derivatives or combinations thereof. In certain embodiments, the introduction of the acidic treatment fluid may be carried out at or above a pressure sufficient to create or enhance one or more fractures within the subterranean formation (e.g., fracture acidizing). In other embodiments, the introduction of the acidic treatment fluid may be carried out at a pressure below that which would create or enhance one or more fractures within the subterranean formation (e.g., matrix acidizing).

Figure 3:
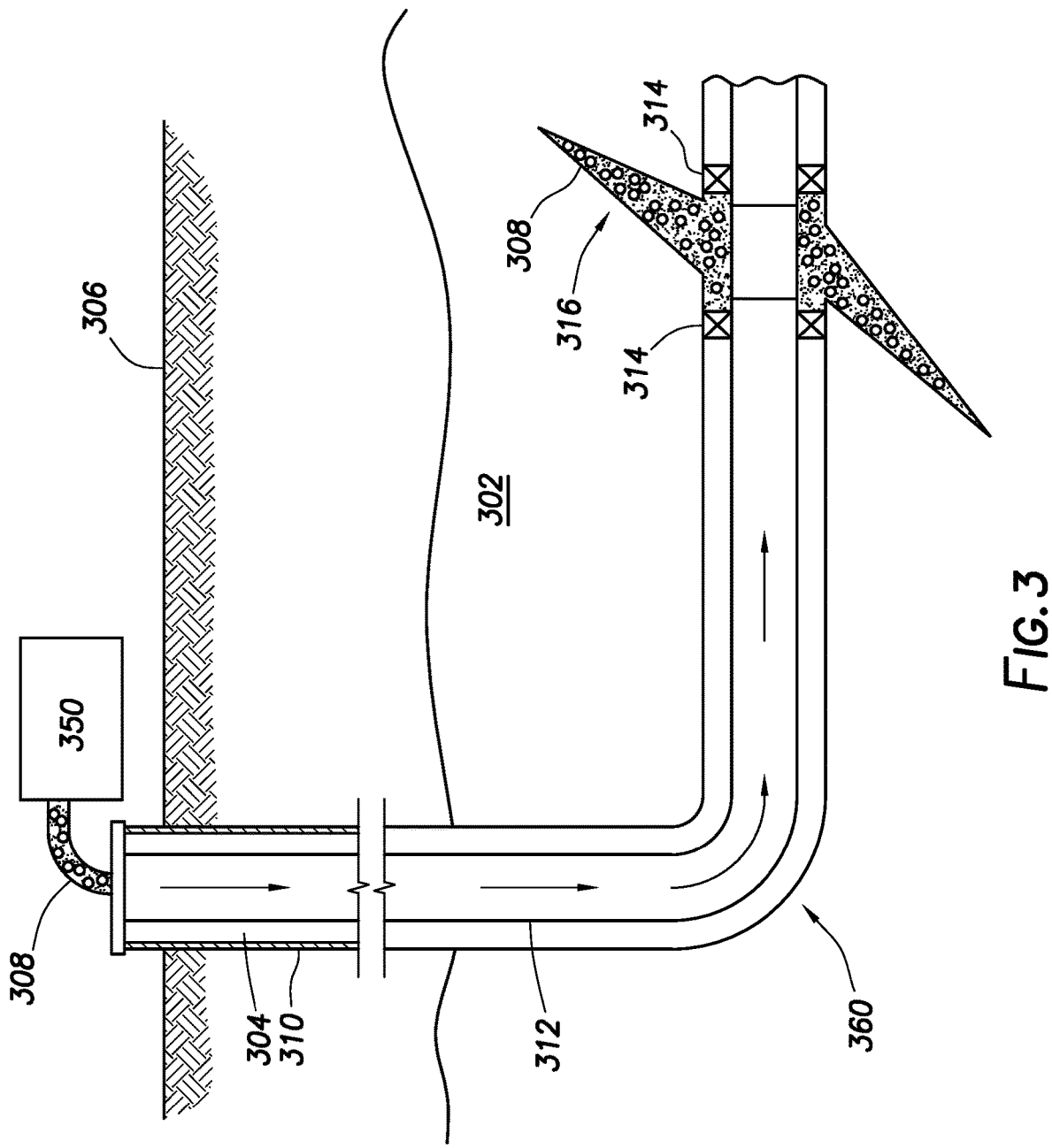
FIG. 3 is a diagram illustrating an example of a subterranean formation in which a fracturing operation may be performed in accordance with certain embodiments of the present disclosure.

FIG. 3 shows the well 360 during a fracturing operation in a portion of a subterranean formation of interest 302 surrounding a wellbore 304. The wellbore 304 extends from the surface 306, and the fracturing fluid 308 is applied to a portion of the subterranean formation 302 surrounding the horizontal portion of the wellbore. Although shown as vertical deviating to horizontal, the wellbore 304 may include horizontal, vertical, slant, curved, and other types of wellbore geometries and orientations, and the fracturing treatment may be applied to a subterranean zone surrounding any portion of the wellbore. The wellbore 304 can include a casing 310 that is cemented or otherwise secured to the wellbore wall. The wellbore 304 can be uncased or include uncased sections. Perforations can be formed in the casing 310 to allow fracturing fluids and/or other materials to flow into the subterranean formation 302. In cased wells, perforations can be formed using shape charges, a perforating gun, hydro jetting and/or other tools.

The well is shown with a work string 312 depending from the surface 306 into the wellbore 304. A pump and blender system 350 is coupled a work string 312 to pump the fracturing fluid 308 into the wellbore 304. The working string 312 may include coiled tubing, jointed pipe, and/or other structures that allow fluid to flow into the wellbore 304. The working string 312 can include flow control devices, bypass valves, ports, and or other tools or well devices that control a flow of fluid from the interior of the working string 312 into the subterranean zone 302. For example, the working string 312 may include ports adjacent the wellbore wall to communicate the fracturing fluid 308 directly into the subterranean formation 302, and/or the working string 312 may include ports that are spaced apart from the wellbore wall to communicate the fracturing fluid 308 into an annulus in the wellbore between the working string 312 and the wellbore wall.

The working string 312 and/or the wellbore 304 may include one or more sets of packers 314 that seal the annulus between the working string 312 and wellbore 304 to define an interval of the wellbore 304 into which the fracturing fluid 308 will be pumped. FIG. 3 shows two packers 314, one defining an uphole boundary of the interval and one defining the downhole end of the interval. When the fracturing fluid 308 is introduced into wellbore 304 (e.g., in FIG. 3, the area of the wellbore 304 between packers 314) at a sufficient hydraulic pressure, one or more fractures 316 may be created in the subterranean zone 302. The proppant particulates in the fracturing fluid 308 may enter the fractures 316 where they may remain after the fracturing fluid flows out of the wellbore. These proppant particulates may "prop" fractures 316 such that fluids may flow more freely through the fractures 316.

While not specifically illustrated herein, the disclosed methods and compositions may also directly or indirectly affect any transport or delivery equipment used to convey the compositions to the fracturing system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The following examples demonstrate that ability of the treatment fluids of the present disclosure to form foamed gels that are capable of suspending particulates in accordance with certain embodiments of the present disclosure.

Example 1

A treatment fluid was prepared using tap water and a plurality of swellable particles each comprising a material having a foamable surfactant and a pH-responsive moiety in accordance with certain embodiments of the present disclosure. The concentration of the swellable particles in the tap water was 1 percent. The treatment fluid began to foam slightly when the swellable particles were added to the tap water, but the swellable particles did not swell. One drop of glycolic acetic acid was then added the treatment fluid to reduce the pH of the treatment fluid to about 5, and the treatment fluid was stirred for about 30 seconds or more. The swellable particles swelled (as indicated by a volume dilation) upon a reduction of the pH and a foamed gel was formed. Thus, Example 1 demonstrates the compositions and methods of the present disclosure provide, among other benefits, swellable particles that may swell upon a reduction of pH to form a foamed gel thereby allowing for the swellable particle to be combined with the aqueous base fluid prior to transportation of the treatment fluid to a well site without the risk of substantial premature swelling.

Example 2

Two treatment fluids were prepared using swellable particles comprising the same material as used in Example 1. The first treatment fluid was prepared using freshwater. The second treatment fluid was prepared using produced water from a formation. One drop of glycolic acetic acid was added to each treatment fluid to reduce the pH of the treatment fluid to about 5, and the treatment fluids were stirred to form stable foamed gels. High Strength Proppant was then added to each foamed gel. The treatment fluids were stored in a 200° F. water bath for 10 hours with the High Strength Proppant suspended in each foamed gel. The foamed gels remained stable for at least 10 hours and the High Strength Proppant remained substantially suspended in the foamed gels during that time. Thus, Example 2 demonstrates the compositions and methods of the present disclosure provide, among other benefits, a stable foamed gel treatment fluid that is able to suspend particulates long enough for the particulates to be placed in a desired location within a wellbore.

An embodiment of the present disclosure is a method comprising: preparing a treatment fluid comprising an aqueous base fluid and a swellable particle that comprises a material having a first monomer, a second monomer, and a third monomer comprising a foamable surfactant; blending the treatment fluid with a gas to form a foamed gel; and introducing the foamed gel into a wellbore penetrating at least a portion of a subterranean formation.

Another embodiment of the present disclosure is a method comprising: preparing a treatment fluid comprising an aqueous base fluid and a swellable particle that comprises a material having a first monomer, a second monomer, and a third monomer comprising a foamable surfactant; introducing the treatment fluid into a wellbore penetrating at least a portion of a subterranean formation; and blending the treatment fluid while in the wellbore to form a foamed gel.

Another embodiment of the present disclosure is a treatment fluid comprising: an aqueous base fluid, a gas, a plurality of particulates, and a plurality of swellable particles each comprising a material having a first monomer, a second monomer, and a third monomer comprising a foamable surfactant.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A treatment fluid comprising: an aqueous base fluid, a gas, a plurality of particulates, and a plurality of swellable particles each comprising a material having a first monomer, a second monomer, and a third monomer comprising a foamable surfactant.

2. The treatment fluid of claim 1, wherein the treatment fluid is a foamed gel and wherein at least a portion of the plurality of particulates is suspended in the foamed gel.

3. The treatment fluid of claim 1, further comprising a surfactant selected from the group consisting of: a laureth sulfate, a lauryl sulfate, sodium cocoyl sarcosinate, decyl polyglucose, cocamidopropyl amine oxide, lauramide DEA, cocamidopropyl betaine (CAPB), sodium cocoamphoacetate (CAA), and any combination thereof.

4. The treatment fluid of claim 1, wherein the second monomer comprises a pH-responsive moiety.

5. The treatment fluid of claim 1, wherein the third monomer is acrylic acid esterified with the foamable surfactant.

6. The treatment fluid of claim 1, wherein the third monomer is methacrylic acid esterified with the foamable surfactant.

7. The treatment fluid of claim 1, wherein the plurality of swellable particles are present in the treatment fluid in an amount from about 0.01 to about 3,000 pounds swellable particles per 1,000 gallons of treatment fluid.

8. The treatment fluid of claim 1, wherein the plurality of swellable particles are present in the treatment fluid in an amount from about 10 to about 200 pounds swellable particles per 1,000 gallons of treatment fluid.

9. The treatment fluid of claim 1, wherein the material has the following structural formula:

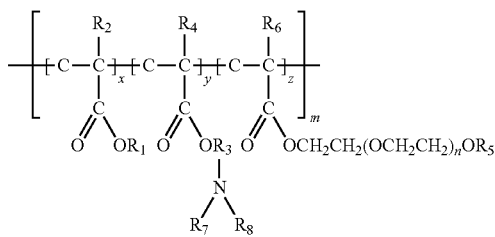

wherein $R_1$ and $R_3$ each are independently a $C_1$ to $C_6$ alkyl chain;

wherein $R_2$, $R_4$, and $R_6$ each are independently selected from the group consisting of: a hydrogen atom or a methyl group;

wherein $R_7$ and $R_8$ each are independently selected from the group consisting of: a hydrogen atom and a $C_1$ to $C_4$ alkyl chain;

wherein $R_5$ is selected from the group consisting of: an alkyl chain, an alkyl phenol, a dialkyl phenol, a fatty acid ester, a sorbitan fatty acid ester, and any combination thereof;

wherein m, x, y, and z each are independently an integer from 1 to about 100,000; and wherein n is an integer from about 2 to about 39.

10. The treatment fluid of claim 1, wherein the material has the following structural formula:

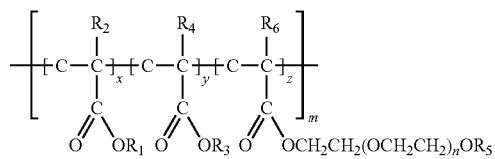

wherein $R_1$ and $R_3$ each are independently a $C_1$ to $C_6$ alkyl chain;

wherein $R_2$, $R_4$, and $R_6$ each are independently selected from the group consisting of: a hydrogen atom or a methyl group;

wherein $R_5$ is selected from the group consisting of: an alkyl chain, an alkyl phenol, a dialkyl phenol, a fatty acid ester, a sorbitan fatty acid ester, and any combination thereof;

wherein m, x, y, and z each are independently an integer from 1 to about 100,000; and wherein n is an integer from about 2 to about 39.

11. A treatment fluid comprising: an aqueous base fluid, a gas, a plurality of particulates, and a plurality of swellable particles each comprising a material having a first monomer, a second monomer, and a third monomer comprising a foamable surfactant, wherein the treatment fluid is a foamed gel and wherein at least a portion of the plurality of particulates is suspended in the foamed gel, wherein the second monomer comprises a pH-responsive moiety, and wherein the third monomer is acrylic acid esterified with the foamable surfactant, and further comprising a surfactant selected from the group consisting of: a laureth sulfate, a lauryl sulfate, sodium cocoyl sarcosinate, decyl polyglucose, cocamidopropyl amine oxide, lauramide DEA, cocamidopropyl betaine (CAPB), sodium cocoamphoacetate (CAA), and any combination thereof.

12. The treatment fluid of claim 11, wherein the third monomer is methacrylic acid esterified with the foamable surfactant.

13. The treatment fluid of claim 11, wherein the plurality of swellable particles are present in the treatment fluid in an amount from about 0.01 to about 3,000 pounds swellable particles per 1,000 gallons of treatment fluid.

14. The treatment fluid of claim 11, wherein the plurality of swellable particles are present in the treatment fluid in an amount from about 10 to about 200 pounds swellable particles per 1,000 gallons of treatment fluid.

15. The treatment fluid of claim 11, wherein the material has the following structural formula:

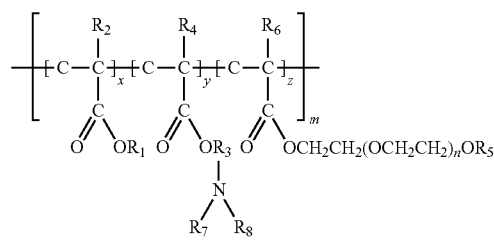

wherein $R_1$ and $R_3$ each are independently a $C_1$ to $C_6$ alkyl chain;

wherein $R_2$, $R_4$, and $R_6$ each are independently selected from the group consisting of: a hydrogen atom or a methyl group;

wherein $R_7$ and $R_8$ each are independently selected from the group consisting of: a hydrogen atom and a $C_1$ to $C_4$ alkyl chain;

wherein $R_5$ is selected from the group consisting of: an alkyl chain, an alkyl phenol, a dialkyl phenol, a fatty acid ester, a sorbitan fatty acid ester, and any combination thereof;

wherein m, x, y, and z each are independently an integer from 1 to about 100,000; and wherein n is an integer from about 2 to about 39.

16. The treatment fluid of claim 11, wherein the material has the following structural formula:

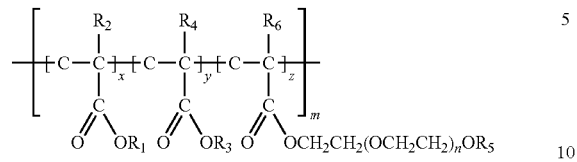

wherein $R_1$ and $R_3$ each are independently a $C_1$ to $C_6$ alkyl chain;

wherein $R_2$, $R_4$, and $R_6$ each are independently selected from the group consisting of: a hydrogen atom or a methyl group;

wherein $R_5$ is selected from the group consisting of: an alkyl chain, an alkyl phenol, a dialkyl phenol, a fatty acid ester, a sorbitan fatty acid ester, and any combination thereof;

wherein m, x, y, and z each are independently an integer from 1 to about 100,000; and wherein n is an integer from about 2 to about 39.

* * * * *